Figure 1:
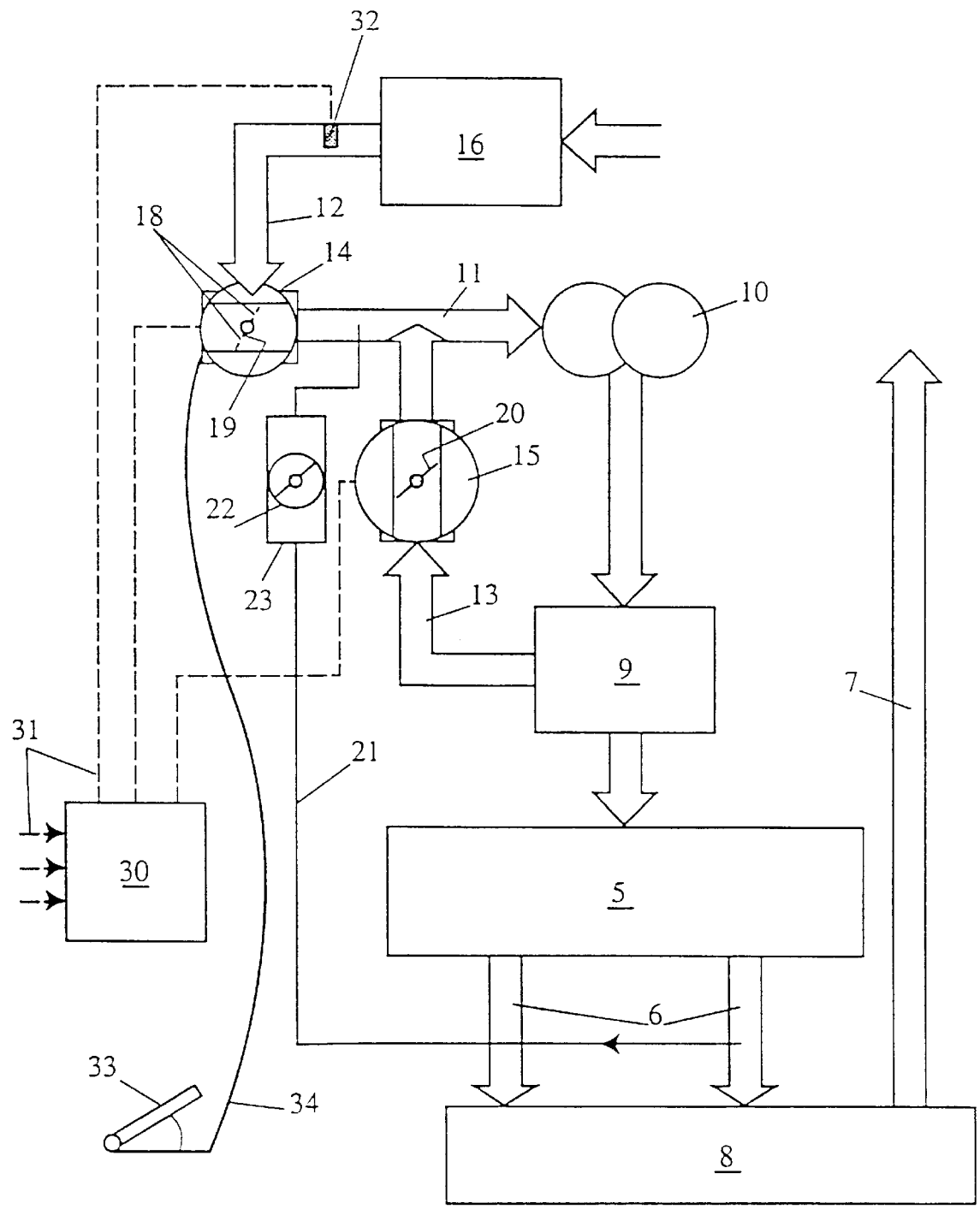

United States Patent

Bell et al.

[11] Patent Number: 5,803,027
[45] Date of Patent: Sep. 8, 1998

[54] SUPERCHARGED INTERNAL COMBUSTION ENGINE

[75] Inventors: Gregory Bruce Bell, Woodlands; Stephen Reinhard Malss, Woodvale, both of Australia

[73] Assignee: Orbital Engine Company (Australia) Pty. Limited, Balcatta, Australia

[21] Appl. No.: 875,350
[22] PCT Filed: Feb. 16, 1996
[86] PCT No.: PCT/AU96/00077
§ 371 Date: Jul. 28, 1997
§ 102(e) Date: Jul. 28, 1997
[87] PCT Pub. No.: WO96/26357
PCT Pub. Date: Aug. 29, 1996

[30] Foreign Application Priority Data

Feb. 20, 1995 [AU] Australia ................. PN1261

[51] Int. Cl.⁶ ................................... F02B 39/04
[52] U.S. Cl. ................... 123/65 BA; 123/559.1; 123/564
[58] Field of Search ............... 123/65 BA, 564, 123/565, 559.1

[56] References Cited

U.S. PATENT DOCUMENTS

| | | | |
|---|---|---|---|
| 3,680,305 | 8/1972 | Miller | 123/65 BA |
| 4,498,429 | 2/1985 | Satow et al. | 123/564 |
| 4,864,979 | 9/1989 | Eickmann | 123/65 BA |
| 4,956,973 | 9/1990 | Fortnagel et al. | 60/605.2 |
| 4,966,104 | 10/1990 | Hundleby | 123/65 BA |
| 4,995,347 | 2/1991 | Tate et al. | 123/65 BA |
| 5,022,367 | 6/1991 | Morikawa | 123/65 BA |
| 5,142,866 | 9/1992 | Yanagihara et al. | 60/605.2 |
| 5,163,388 | 11/1992 | Jonsson | 123/65 BA |
| 5,203,309 | 4/1993 | Goto et al. | 123/564 |
| 5,273,004 | 12/1993 | Duret et al. | 123/65 BA |
| 5,307,792 | 5/1994 | Takahashi et al. | 123/65 BA |
| 5,309,886 | 5/1994 | Hitomi et al. | 123/570 |
| 5,365,908 | 11/1994 | Takki et al. | 60/601 |
| 5,423,392 | 6/1995 | Kobayashi et al. | 180/197 |
| 5,454,360 | 10/1995 | Shimizu et al. | 123/564 |

FOREIGN PATENT DOCUMENTS 41 03 870 A1   8/1991   Germany.

*Primary Examiner*—David A. Okonsky
*Attorney, Agent, or Firm*—Nikaido, Marmelstein, Murray & Oram LLP

[57] ABSTRACT

A method of controlling the air supply to a scavenged internal combustion engine having a blower for suppling air thereto and bypass means for allowing a bypass air flow from the outlet side of the blower to the inlet side thereof, the method including regulating the bypass air flow through the bypass means to provide a variable rate of air flow therethrough and regulating the flow of ambient air to the blower to thereby control the pressure of the intake air supply to the blower and controlling a supply of recirculated exhaust gas introduced upstream of the blower by controlling the flow rate of ambient air to the blower such that a requisite pressure is generated upstream of the blower to thereby control the exhaust gas flow rate.

29 Claims, 1 Drawing Sheet

SUPERCHARGED INTERNAL COMBUSTION ENGINE

This invention relates to scavenged internal combustion engines and particularly to engines wherein the scavenging is effected by a blower or the like. In particular, the invention is applicable to two stroke cycle engines and especially to direct injected two stroke cycle engines.

In blower scavenged engines, particularly those incorporating a positive displacement type blower wherein the blower is driven at a speed directly proportional to the engine speed, the rate of air supply by the blower at idle and part loads typically substantially exceeds the requirements of the engine and in this regard it is known to provide for recycling of the air output from the blower back to the inlet of the blower at such engine loads. This is typically achieved with a bypass circuit controlled by a bypass valve, this bypass valve generally being an "on-off" valve which is either completely opened to allow for the recirculation of a majority of the air output from the blower, or is alternatively completely closed to prevent any such recirculation of the air output from the blower. This bypassing arrangement has the advantage that the overall energy required to drive the blower is reduced, particularly when compared with systems where the control of the air output from the blower is achieved by throttling the output thereof.

However, at lower engine loads, the pressure drop in the bypass or recycling loop is typically higher than that through the engine. Hence, such a bypass arrangement will generally not satisfactorily control air flow to the engine at idle and low loads as the lower pressure drop through the engine than through the bypass circuit will typically result in more air than is required by the engine at such loads being delivered thereto. Accordingly, unless a slight vacuum or low pressure is created upstream of the blower to overcome the existing flow restriction in the bypass or recycling loop, more air than is required is still likely to be delivered to the engine at such lower loads.

Further, without such a restriction upstream of the blower, some difficulty may exist in regard to inputting a desired level of exhaust gas into the intake system for the purpose of exhaust emission control. In this regard and as is well known, it is in some circumstances desirable to have a high proportion of exhaust gas in the fuel and air mixture within the combustion chambers of the engine, particularly during low load operation, in order to achieve a required level of emission control.

It is therefore an object of the present invention to provide a method and apparatus for controlling the air flow to a scavenged engine that will enable the overall energy required to drive a blower supplying air thereto to be reduced and that will allow effective control of the air flow rate to the engine over the entire load range of the engine and in particular at idle and low to medium loads. It is a further object of the present invention that the air flow rate to the engine will be effectively controlled whilst the ability to provide effective exhaust gas recirculation to the engine, particularly at low and medium loads, will be improved or at least maintained.

With this object in view, there is provided a method of controlling the air supply to a scavenged internal combustion engine having a blower for supplying air thereto and bypass means for allowing a bypass air flow from the outlet side of the blower to the inlet side thereof, the method including regulating the bypass air flow through the bypass means to provide a variable rate of air flow therethrough and regulating the flow of ambient air to the blower to thereby control the pressure of the intake air supply to the blower.

Conveniently, the bypass air flow and the flow of ambient air to the blower are regulated to control the air supply to the engine at least when the engine is operating at idle and/or low loads.

Preferably, the flow of ambient air to the blower is also regulated to provide a variable rate of ambient air flow thereto.

The bypass air flow rate and the flow rate of ambient air to the blower are preferably independently controlled.

These two controls ensure that the airflow to the engine can be suitably controlled for any load point of the engine so that the overall power requirements of the blower can be minimised. Furthermore, the combined effect of the above two controls enables the provision of a more favourable environment through which desired levels of exhaust gas may be recirculated through the engine. That is, the pressure of the intake air to the blower is able to be maintained at a level to achieve the required level of exhaust gas recirculation (EGR) from the engine exhaust system back into the air intake system, particularly at idle and low loads where such EGR is commonly used to control the exhaust emissions. This is primarily achieved by controlling the flow rate of ambient air to the blower, and to a lesser extent by controlling the bypass air flow rate, such that a low pressure is generated upstream of the blower resulting in a more favourable condition to exist for EGR. Still further, bypassing sufficient air from the outlet side of the blower relieves the load on the blower such that it is not delivering too much air at a load point at which the engine does not require the blower to be working near or at its maximum capacity. This in turn avoids undue overheating of the air delivered by the blower.

Conveniently, a valve is provided to control the bypass rate of the air output from the blower, the valve being configured to provide for a variable rate of bypassed air. Conveniently, the bypass valve is controlled by an electronic control unit which receives inputs indicative of the operating conditions of the engine, for example, from an air flow meter measuring the ambient air flow to the engine. The control of the flow rate of ambient air to the blower is preferably controlled by a valve actuated in response to driver inputs such as by a throttle valve actuated by the accelerator or throttle pedal of a vehicle. However, other control arrangements for each valve are also envisaged. For example, both valves may be controlled by the electronic control unit wherein the bypass valve is primarily controlled on the basis of the ambient air flow as measured by an air flow meter and the ambient air valve is controlled by a mapped position in an appropriate look-up table which has throttle or pedal position as a main input thereto. Alternatively, this arrangement could be reversed wherein the bypass valve is controlled by the mapped position selected as a function of throttle or pedal position and the ambient air valve is controlled on the basis of the measured ambient air flow.

The typical relationship of the positioning of the bypass valve and the ambient air valve at idle is such that approximately 90% of the air output from the blower is returned through the bypass to the inlet of the blower whilst the ambient air valve is substantially fully closed. It should be noted that the bypass valve at such a load condition is preferably only 50% open so as to give good control of the air flow rate though the bypass duct and hence better overall engine air flow control. Under light load conditions, the bypass valve is conveniently as open as possible whilst still maintaining good air flow control to the engine and the ambient air valve is substantially fully closed, whilst at full or high load conditions, the bypass valve is typically fully closed and the ambient air valve is fully opened. The ambient air valve is configured so as to give minor control over the air flow control system as compared to the bypass valve and is essentially provided to create a restriction upstream of the blower for more positive air flow control by the bypass valve and to provide a more favourable condition which will enable a flow of exhaust gas as desired to a point upstream of the blower, in particular at idle and low loads. In this regard, the restriction provided typically contributes to the creation of a desirable low pressure upstream of the blower and immediately downstream of the ambient air valve.

Further, it is envisaged that the relationship of the positioning of the bypass valve and the ambient air valve will enable the level or amount of EGR used for exhaust emission control to be varied as desired. That is, for various different arrangements of the bypass valve and ambient air valve positions, different flow rates of exhaust gas to the point immediately downstream of the ambient air valve are possible. For example, a certain combination of bypass and ambient air valve positioning will provide for a certain air flow rate through the bypass and for a certain resultant air flow rate to the blower. A second combination of bypass and ambient air valve positioning may also result in a similar resultant air flow rate to the blower but will typically provide for a different air flow rate through the bypass and through the ambient air valve. In the case where exhaust gas is input to the point immediately downstream of the ambient air valve and upstream of the point of communication of the bypass with the main air intake duct, a different low pressure will exist immediately downstream of the ambient air valve than did for the previous positions of the ambient air and bypass valves. Hence, even though the blower receives the same air flow rate as for the previous valve position settings, a different rate of exhaust gas is able to be delivered to the point upstream of the blower. In this regard, a manifold vacuum sensor may be arranged to be the primary input for controlling the bypass valve and the ambient air valve to ensure that a sufficiently low pressure or vacuum exists upstream of the blower for EGR purposes.

It should be noted that typically, the ambient air valve will be configured such that when it is fully closed a minimum amount of ambient air will still be able to pass through the valve to enable effective and correct operation of the air flow control system. In particular, this minimum amount of air will typically be that required to minimise the low pressure or slight vacuum created on the engine side of the ambient air valve by the blower such that it is just sufficient to enable suitable air flow control for the engine and to create a favourable environment to enable a flow of exhaust gas to the engine via the upstream side of the blower, particularly at idle and low engine loads. This minimum amount of ambient air may, for example, conveniently be provided by the provision of one or more orifices or slits in the standard butterfly type valve used in such air intake systems or by providing a butterfly valve with a blade which when fully closed does not closely match the internal profile or perimeter of the duct in which it is located. Alternatively, the ambient air valve may simply be configured to not be able to fully close. The partial or slight minimisation of the low pressure produced on the engine side of the ambient air valve by the minimum amount of ambient air able to flow therethrough ensures that the blower is not operating inefficiently as it would if it were to operate against a near vacuum which would be the case if the ambient air valve was to completely prevent the flow of ambient air therethrough to the engine.

There is further provided by the present invention, a blower scavenging arrangement for an internal combustion engine including a blower for supplying air to the engine, a bypass air control means for regulating a bypass air flow from the outlet side of the blower to the inlet side thereof to thereby provide a variable rate of bypass air flow, and an ambient air control means for regulating the flow rate of ambient air to the blower, wherein said regulation by said bypass air control means and said ambient air control means thereby controls the pressure of the intake air supply to the blower.

Because the bypass air control means provides for a variable rate of air flow through a bypass circuit or loop, the bypass air control means is able to provide better control of the rate of flow of bypass air in contrast to certain prior art systems which simply provide for the bypass loop to be fully open or fully closed. Similarly, the ambient air control means is also preferably able to provide for a variable rate of flow of ambient air to the blower.

Preferably, the bypass air control means and the ambient air control means are interactive to control the pressure of the intake air supply to the blower in response to engine operating conditions.

Conveniently, the bypass air control means is controlled by an electronic control unit which receives inputs indicative of the operating conditions of the engine such as engine load. Typically, the ambient air control means for adjusting the ambient air flow is actuated in response to driver load demand such as would be indicated by vehicle throttle or pedal position. However, as previously indicated, other control arrangements for each valve are also envisaged.

The above described method of and arrangement for controlling the air flow to and hence the operation of the blower ensures that a suitable amount of air is delivered to the engine at any load point over the entire operating regime of the engine, particularly at low and medium loads where the air requirements are not as high in comparison to high load operation. This minimises the overall power requirements of the blower. That is, by bypassing the output air via the bypass valve, the power consumption of the blower will be lower than when compared with, for example, an arrangement where the air output from the blower is merely throttled. Furthermore, the described method also ensures that effective exhaust gas recirculation can be achieved throughout the operating range of the engine, and particularly at idle and low load conditions. Further, the method also ensures that the blower is not unduly overloaded at any engine load point and does not unduly overheat, such as for example, when the ambient air valve is fully closed.

One practical arrangement of the invention will now be described with reference to the accompanying drawing wherein FIG. 1 is a diagrammatic layout of an engine incorporating a blower and a control system therefor.

The engine 5 is a multi-cylinder reciprocating piston engine of generally conventional construction having exhaust ducts 6 communicating the engine cylinders with an exhaust pipe 7 via a catalytic exhaust treatment means 8 of conventional construction. The combustion chamber of each cylinder communicates with the air inlet manifold 9 which distributes air to each combustion chamber in timed relation to the combustion cycle thereof.

Whilst the present invention is described with respect to a multi-cylinder engine, it should be noted that it is equally applicable to single cylinder engines. Further, it is to be noted that the engine 5 as depicted in FIG. 1 is intended to represent a multi-cylinder two stroke cycle engine wherein the fuel is injected directly into the combustion chambers of the engine 5. However, the blower 10 and control system thereof is equally applicable to four stroke cycle engines or to an engine wherein the fuel is injected at a location close to or at the area of entry of the fuel to the respective cylinders of an engine and particularly to stratified charge or variable displacement engines. That is, the blower and control system therefor is not limited to engines wherein the fuel is delivered to the engine independently of the air supply. Equally, the invention is applicable to both spark-ignition and compression-ignition engines.

The blower 10 is of the positive displacement type such as a Roots blower or the like. The blower 10 draws in air via the intake duct 11 which is connected to the ambient air duct 12 and the bypass duct 13. Between the ambient air and intake ducts 11 and 12 respectively is a control valve 14. A further control valve 15 is positioned in the bypass duct 13. The ambient air duct 12 receives air substantially at ambient pressure from an air filter box 16.

The air flow from the ambient air duct 12 to the intake duct 11 is controlled by the valve 14 which is conveniently of the butterfly type, but which may be of any suitable construction. As illustrated, the valve 14 is of the butterfly type and is arranged to be actuated by the driver such as via a throttle pedal 33. The valve 14 is constructed so that even when in the "closed" position, a restricted flow of air may pass from the ambient air duct 12 to the intake duct 11. This may be achieved in relation to the valve 14 as illustrated by the provision of apertures 18 in a blade 19 of the butterfly valve 14. The apertures 18 are sized so that when the engine 5 is operating at idle, the air flow to the blower 10 is sufficient for the engine 5 to operate, and to also draw exhaust gas via EGR duct 21 and EGR control valve 22 from the engine exhaust system to be recirculated into the engine combustion chambers at a desired rate when required. The apertures 18 may alternatively be in the form of orifices or slits. An appropriate cooling means or heat exchanger 23 may be provided to enable cooling of the exhaust gas prior to being input to the engine 5 via the intake duct 11.

The provision of apertures 18 ensures that the low pressure or slight vacuum created on the engine side of the valve 14 within the intake duct 11 is minimized to enable control of both air flow to the blower 10 and exhaust gas flow into the intake duct 11. In particular, the size of the apertures 18 should be selected such that the minimization of the slight vacuum on the engine side of the valve 14 is so as to reduce the pressure drop within the bypass duct 13 to an acceptable level such that air will be enticed to flow into the bypass duct 13 and not the engine 5 when the bypass valve 15 is opened. The total area of the apertures 18 may be up to 40% of the maximum flow area through the valve 14 after which too much air is likely to flow into the intake duct 11 to provide a suitable low pressure in this region. The minimum area may be 0% of the maximum flow area, however, as previously mentioned, this would probably cause the blower 10 to operate inefficiently and possibly overheat. Accordingly, the minimum area should be sufficient to provide a suitable minimum air flow into the intake duct 11. This will ensure that the blower 10 does not unduly overheat.

The bypass duct 13 has incorporated therein a bypass control valve 15, which may be of the butterfly type, and which is operable to control the rate of flow of air bypassed from the downstream or outlet side of the blower 10 to the upstream or inlet side thereof. The control valve 15 comprises a blade 20 and is constructed so that in the closed position, there is substantially no flow through the bypass duct 13.

The bypass valve 15 is automatically controlled by an electronic control unit (ECU) 30 which receives inputs 31 related to at least the ambient air flow into the engine 5, engine speed, throttle pedal position (load) and engine temperature. The position of the butterfly valve 14 is varied in response to the position of the accelerator pedal 33 via a cable 34 in a known manner. The position of the butterfly valve 14 is therefore a function of the load on the engine 5 and this position can also be determined, typically by feedback means to the ECU 30, to provide a further input thereto related to the load on the engine 5. The air flow is measured by an air flow meter 32 mounted in the ambient air duct 12 immediately downstream of the air filter box 16. The bypass valve 15 is principally controlled in dependence on the measured ambient air flow as measured by the air flow meter 32. The ECU 30 is programmed to close the valve 15 when the engine 5 is operating in the medium to high load range as the rate of air supply required by the engine 5 is high and is able to be supplied by the blower 10 without the need to bypass any of the output air therefrom. At these conditions, the full air output of the blower 10 is typically required by the engine 5. Further, the resulting sub-atmospheric pressure in the intake duct 11 is sufficiently high to effectively provide the required level of EGR into the respective combustion chambers of the engine 5.

However, when the engine 5 is operating at low loads or at idle, the ECU 30 is programmed to open the bypass valve 15 to return air from the high pressure or delivery side of the blower 10 to the intake air duct 11 to be recycled through the blower 10. At such low loads, the valve 14 is typically substantially closed and air control to the blower 10 and hence engine 5 is primarily via bypass valve 15. This bypassing of air maintains the blower 10 operating with a full supply of air, while also not having an excess of air being delivered to the engine 5. That is, the ambient air valve 14 essentially serves to create a low pressure or slight vacuum upstream of the blower 10 which creates a condition where it is more favourable for air to pass through the bypass duct 13 as opposed to passing through the engine 5.

Further and as previously alluded to hereinbefore, the positioning of the ambient air valve 14 and the bypass valve 15 may be utilised to provide for different levels of exhaust gas to the engine 5 via the EGR means. That is, for similar air flow rates to the blower 10, different levels of exhaust gas can be drawn into the intake duct 11 for subsequent delivery to the engine 5. This can be deduced from a consideration of FIG. 1 wherein the EGR duct 21 communicates with the intake duct 11 upstream of the point of communication of the bypass duct 13 with the intake duct 11. Accordingly, from different position settings of the valves 14 and 15 which provide for a similar air flow rate to the blower 10, a different level of low pressure will exist immediately downstream of the ambient air valve 14. Hence, different levels of EGR are able to be used for emission control.

Modifications and variations as could be made by a skilled addressee are deemed to be within the scope of the present invention. For example, the ambient air valve 14 may be spring loaded in a similar manner to a vehicle choke and may further include a mechanism to retain the blade 19 thereof in the fully opened position at wide open throttle or full load only. This may be achieved for instance by a cable connecting the blade 20 of the bypass valve 15 with the blade 19 of the ambient air valve 14 and a lost motion mechanism being incorporated on the blade 20. In operation, at idle and low load operation, the blade 19 is in the fully closed position whilst the blade 20 is typically as open as possible. As the engine 5 goes from low to medium and then to high load operation, the blade 20 begins to move to the fully closed position. Initial movement in this regard has no effect on the blade 19 as the lost motion mechanism takes up this movement. Further movement however, typically corresponding to the engine 5 moving into high load operation, causes the blade 20 to move to the completely closed position and to also move the blade 19 via the connecting cable into the fully opened position. Other mechanical or hybrid mechanical/electronic arrangements for actuating the air valves 14 and 15, whether independently or jointly, are deemed to be within the scope of the present invention.

We claim:

1. A method of controlling the air supply to a scavenged internal combustion engine having a blower for supplying air thereto and bypass means for allowing a bypass air flow from the outlet side of the blower to the inlet side thereof, the method including regulating the bypass air flow through the bypass means to provide a variable rate of air flow therethrough and regulating the flow of ambient air to the blower to thereby control the pressure of the intake air supply to the blower and controlling a supply of recirculated exhaust gas introduced upstream of the blower by controlling the flow rate of ambient air to the blower such that a requisite pressure is generated upstream of the blower to thereby control the exhaust gas flow rate.

2. A method according to claim 1 wherein the air supply to the engine is controlled at least when the engine is operating at idle and/or at low loads.

3. A method according to claim 1 wherein the flow of ambient air to the blower is regulated to provide a variable rate of ambient air flow thereto.

4. A method according to claim 1 wherein the bypass air flow rate and the ambient air flow rate to the blower are independently controlled.

5. A method according to claim 1 wherein the pressure of the intake air supply to the blower is controlled as a function of engine operating conditions.

6. A method according to claim 1 including bypassing a greater proportion of air supplied by the blower when the engine is operating at idle or at low loads than when the engine is operating at higher loads.

7. A method according to claim 1 including providing different exhaust gas flow rates while maintaining the overall air flow rate to the blower.

8. A method according to claim 1 including controlling the bypass air flow rate and the ambient air flow rate as a function of engine operating conditions.

9. A method according to claim 8 including primarily controlling the bypass air flow rate as a function of the ambient air flow to the engine.

10. A method according to claim 8 including controlling the ambient air flow rate as a function of an operator load demand on the engine.

11. A method according to claim 1 including maintaining at least a minimum ambient air flow to the blower during engine operation.

12. A method according to claim 11 wherein the minimum ambient air flow is the minimum required to generate a requisite pressure upstream of the blower to thereby enable exhaust gas recirculation thereto.

13. A method of controlling the air supply to a scavenged internal combustion engine having a blower for supplying air thereto and bypass means for allowing a bypass air flow from the outlet side of the blower to the inlet side thereof, the method including regulating the bypass air flow through the bypass means to provide a variable rate of air flow therethrough and regulating the flow of ambient air to the blower to thereby control the pressure of the intake air supply to the blower, and controlling the supply of recirculated exhaust gas upstream of the blower by controlling the bypass air flow rate and the flow rate of ambient air to the blower such that a requisite pressure is generated upstream of the blower to thereby control the exhaust gas flow rate.

14. A blower scavenging arrangement for an internal combustion engine including a blower for supplying air to the engine, a bypass air control means for regulating a bypass air flow from the outlet side of the blower to the inlet side thereof to thereby provide a variable rate of bypass air flow, an ambient air control means for regulating the flow rate of ambient air to the blower, and exhaust gas recirculation means for recirculating exhaust gas to the engine, the exhaust gas being returned upstream of the blower, wherein said regulation by said bypass air control means and said ambient air control means thereby controls the pressure of the intake air supply to the blower and the rate of exhaust gas recirculation is regulated by controlling the bypass air flow rate and the flow rate of ambient air to the blower.

15. An arrangement according to claim 14 wherein the bypass air control means and the ambient air control means are independently controlled.

16. An arrangement according to claim 14 wherein the bypass air control means provides the primary control of the air supply to the engine.

17. An arrangement according to claim 14 wherein the ambient air control means primarily serves to create a flow restriction upstream of the blower during idle and/or low load engine operating conditions.

18. An arrangement according to claim 14 wherein the bypass air control means and the ambient air control means are interactive to control the pressure of the intake air supply to the blower in response to engine operating conditions.

19. An arrangement according to claim 14 wherein the bypass air control means includes a bypass duct and a bypass valve for providing the variable rate of bypass air therethrough.

20. An arrangement according to claim 19 wherein the bypass valve is controlled by an electronic control unit as a function of the engine operating conditions.

21. An arrangement according to claim 20 including an air flow meter for measuring the ambient air flow rate to the engine wherein the bypass valve is primarily controlled on the basis of the ambient air flow rate.

22. An arrangement according to claim 14 wherein the ambient air control means includes an ambient air valve for regulating the rate of ambient air to the blower.

23. An arrangement according to claim 22 wherein the ambient air valve is able to provide for a variable rate of ambient air flow to the blower.

24. An arrangement according to claim 22 wherein the ambient air valve is controlled as a function of an operator load demand on the engine.

25. An arrangement according to claim 22 wherein the ambient air valve is controlled by an electronic control unit as a function of a vehicle throttle or pedal position.

26. An arrangement according to claim 22 wherein the ambient air valve is of the butterfly type and includes orifices or slits therethrough.

27. An arrangement according to claim 22 wherein the ambient air valve is arranged to allow for a minimum flow of ambient air to the blower even when in the fully closed position.

28. An arrangement according to claim 14 wherein the engine is a direct injected two stroke cycle engine.

29. An arrangement according to claim 14 wherein the engine is a spark ignited internal combustion engine.

* * * * *